UNITED STATES PATENT OFFICE.

EDWARD E. ARNOLD, OF COVENTRY, AND PALMER ST. CLAIR, JR., OF PROVIDENCE, RHODE ISLAND, ASSIGNORS TO THE NITROGEN CORPORATION, OF PROVIDENCE, RHODE ISLAND, A CORPORATION OF RHODE ISLAND.

METHOD OF CONDUCTING THE AMMONIA-SODA PROCESS.

1,423,510.      Specification of Letters Patent.     Patented July 25, 1922.

No Drawing.      Application filed March 11, 1920. Serial No. 365,087.

*To all whom it may concern:*

Be it known that we, EDWARD E. ARNOLD and PALMER ST. CLAIR, Jr., citizens of the United States, respectively residing at Coventry, in the county of Kent, and at Providence, in the county of Providence and State of Rhode Island, have invented certain new and useful Improvements in Methods of Conducting the Ammonia-Soda Process, of which the following is a specification.

Our invention relates to an improvement in what is commonly known as the ammonia soda process, and has for one of its objects the elimination of certain sources of trouble and expense which are encountered in said process as heretofore conducted.

We have further aimed to reduce the initial cost of the apparatus required for the effectuation of the ammonia soda process; as well as the cost of maintenance or upkeep. These and other objects of our invention will be hereinafter referred to and the novel combinations of steps in our improved process will be more particularly pointed out in the claims appended hereto.

As we are aware of various changes and modifications which may be made in our process without departing from the spirit of our invention, we desire to be limited only by the scope of said claims, broadly interpreted in the light of our disclosure.

So far as we are aware, practically all modern ammonia soda plants depend for successful operation, chiefly upon the functioning of the ammonia absorbed, where brine is ammoniated, and upon the carbonating tower, where the bicarbonate of soda is precipitated from the ammoniated brine while the latter is being traversed by carbon dioxid gas.

On account of the development of heat engendered by absorption of ammonia gas by the brine in the ammonia absorber, and, similarly, on account of the exothermicity of the reaction in the carbonating tower which yields the bicarbonate, efficient operation of these two units, is largely dependent, in the most modern designs of these important pieces of apparatus, upon suitable cooling.

That is to say, that in most respects, we consider that the more recently designed apparatus of this character, is capable of very nearly maximum efficiency of operation under climatic conditions which favor proper temperature regulation, and the principal remaining problem to be solved, in this connection, is how to properly take care of the heats of the aforesaid reactions, especially in large size apparatus and under unfavorable climatic conditions.

This cooling must not only be upon a sufficiently large scale, but it must further be properly distributed to the various parts of the apparatus, to attain the best results, especially in the carbonating towers.

In existing apparatus, this cooling is mainly effected by means of water pipe coils, or by "nests" of straight water tubes with headers passing through various sections of the towers. In the carbonating tower it is especially advisable to properly distribute the cooling; because these towers are usually of considerable height and a large number of cooling coils or "nests" of tubes are inserted in the tower sections.

At present it is necessary to maintain a large and extensive water pipe system for effecting this cooling of both the carbonating and absorber towers, and in many installations a large refrigerating plant is also found requisite for still further cooling in warm weather; particularly in warm countries.

These present methods of cooling, with their extensive ramifications and appendages, constitute a large plant cost, and their use and upkeep appreciably increases the cost of product.

Our method, permits, if desired, of completely doing away with this extensive outlay, and of obviating the trouble arising from oxidation of the piping with consequent leakage of water.

Recent developments which we have effected in connection with the manufacture of synthetic ammonia have made available at relatively low cost, large quantities of liquid ammonia under high pressure, as well as liquid carbon dioxid; the latter of course also being under pressure.

Both ammonia and carbon dioxid enter as important factors into the manufacture of sodium bicarbonate; since, of course, ammonia must be supplied to the brine and carbon dioxid must be supplied to the carbonating towers as aforesaid.

We therefore, contemplate supplying these substances, preferably in the liquid phase and under pressure, respectively to the absorber and carbonating tower of an ammonia soda process plant, and then cause each of these substances to perform a plurality of functions.

The liquid carbon dioxid under pressure, may, for example, be conducted to the carbonating tower or towers; the pipe through which such liquid is conveyed,—if our method is to be applied to apparatus already in existence,—being connected with the then present water cooling coils or "nests" of tubes; the connection to each of these from the liquid pressure supply line being desirably through expansion valves or the like. The expanded fluid is collected at the ends of the nests or coils which lie furthest from the respective expansion valves, and this collected gas is then conducted through a suitable header into the carbonating tower in the usual way and by means of existing pipe connections, or otherwise, as desired. We do not wish to be limited in any way to the admission of the gas into the tower through such customary inlets; since we also contemplate admitting gas which has passed through a given coil or nest, more or less directly into the tower at about the same point. Any excess gas, not so utilized, can be passed to the main gas header which supplies gas to the base of the tower.

Operating in this fashion, the coils or nests become chilled by the expansion of the volatilizable fluid which is subsequently to participate actively in the sodium bicarbonate forming reaction. Further, the expanded carbon dioxid gas admitted into the tower at the bottom, or other desired point, is at such a temperature as to permit of exceedingly efficient refrigeration of the ammoniated brine at the very points where heat is evolved by the reaction of said carbon dioxid upon said brine.

In this manner we are able to control to a nicety the temperature of all portions of the liquid in the tower; which control is conducive to obtaining the product in the preferred form; since, as is well known, the fineness of the crystals of sodium bicarbonate is largely dependent upon the temperature at which they are produced.

The liquid ammonia can be used under similar conditions for properly cooling the absorbers. That is to say, by taking advantage of its absorption of heat during its conversion into the gaseous phase, or its subsequent further expansion, it may be caused to abstract heat from the body of material to which it is to be subsequently delivered, while at the same time even reducing its own temperature, prior to its delivery to the reaction zone. In the latter, the material thus previously employed as a medium for abstracting heat now actively participates in the reaction, and, by such participation, heat is evolved, and this evolved heat is in turn abstracted by the expanding gas which is to be subsequently delivered to said zone.

So far as we are aware, utilization of this multiple action, certainly as regards its application to the ammonia soda process, is distinctively new and it enables us to effectuate great economies of operation and in the cost of apparatus, upkeep of the same, etc.

If a leak occurs in the piping in the carbonating tower through which the expanding carbon dioxid gas is flowing, no harm results; because the gas is identical with that which is to be introduced into the tower for effecting the desired reaction.

If water be used to cool the ammoniated brine in the carbonating tower, and a leak occurs in the piping used for effecting the cooling,—in such case the leak must sooner or later receive attention, because the water tends to dilute the brine to the extent of the leakage and the reaction may be correspondingly deleteriously affected.

As the liquid carbon dioxid and liquid ammonia used in manner aforesaid are preferably under high pressure, to wit, one hundred atmospheres, the refrigerating effects to be obtained from the change of phase and expansion of these fluids, will normally be far more than sufficient to enable efficient operation of the plant even in hot climates. In other words, the present invention makes possible the successful operation of the ammonia soda industry in countries such as India and in desert regions where water is exceedingly scarce and costly.

Of course, the $CO_2$ gas can also be used for refrigerating the absorbers or the like; except that in such case care must be taken to avoid admission of the carbon dioxid, by reason of leakage, into the ammoniated brine in course of saturation in the absorbers,—if one is to avoid formation of sodium bicarbonate in the latter apparatus.

The above described method permits of a regulation and distribution of cooling such as has heretofore been unknown in the ammonia soda process; and, in addition, a product far more desirable and constant in quantity is obtained, than, so far as we are aware, has ever before been approached in existing installations; because, while, in existing plants, when operating under ideal external temperature conditions, a very fine grade of sodium bicarbonate has been produced from time to time,—this production is variable and uncertain.

We may here observe, however, that in order to obtain the very best results, especially in large carbonating towers, we have found it desirable to dilute with nitrogen the substantially pure $CO_2$ gas thus supplied to the reaction, in order to obtain sodium bicarbonate crystals of particularly uniform fineness; since, even with the aforesaid exceedingly efficient and well distributed refrigeration of substantially all parts of the liquid contents of the tower, when undiluted or pure $CO_2$ is supplied to the ammoniated brine, the bircarbonate forming reaction proceeds so vigorously, in spite of the restraint imposed upon it by the lowered temperature, that some tendency to overheat in spots may occur.

Accordingly, in such cases, nitrogen, preferably under moderate pressure, is supplied to the carbon dioxid as it emerges from the expansion valves, to dilute the $CO_2$, say, forty or forty-five per cent.

We may add that the so delivered nitrogen is preferably supplied pulsatorily; as slight variations, or pulses, in the gas entering the liquid, seem to favor the reaction.

The gas emerging from the tower will normally be substantially pure nitrogen which may be collected and returned to the process.

Finally, still another important advantage is derived from the above described mode of conducting the ammonia soda process, in that the expansion blower installation,—used in all existing plants, to force the carbon dioxid gas up through the carbonating towers against the head of the descending liquid,—may be completely eliminated; since, the expanding carbon dioxid, or carbon dioxid and nitrogen mixture, is capable of unaidedly forcing its own way up through the tower.

Having thus described our invention, what we claim is:

1. An improvement in the ammonia soda process, which comprises, expanding highly compressed carbon dioxid gas to develop a refrigerating effect and absorb from a body of ammoniated brine the heat evolved by the reaction of carbon dioxid thereupon, and then in turn reacting with said expanded carbon dioxid gas upon the ammoniated brine.

2. An improvement in the ammonia soda process, which comprises, expanding highly compressed carbon dioxid gas to develop a refrigerating effect and cause said expanding gas to absorb from a body of ammoniated brine the heat evolved by the reaction of carbon dioxid gas with said brine.

3. The improvement in the ammonia soda process which comprises expanding compressed carbon dioxid gas to develop a refrigerating effect and cause said expanding gas to absorb from a body of ammoniated brine the heat evolved by the reaction of carbon dioxid thereupon, admixing nitrogen with said expanded carbon dioxid gas to dilute the same, and reacting upon ammoniated brine with the mixture so produced.

4. The improvement in the ammonia soda process which comprises expanding compressed carbon dioxid gas to develop a refrigerating effect and cause said expanding gas to absorb from a body of ammoniated brine the heat evolved by the reaction of carbon dioxid thereupon, admixing nitrogen with said expanded carbon dioxid gas to dilute the same, and reacting upon ammoniated brine with the mixture so produced, while impulsively delivering said mixture to said brine.

5. The improvement in the ammonia soda process which comprises reacting upon a body of brine with a gas capable of exothermic combination with constituents of said brine, removing from said brine the heat evolved by the said reaction by utilizing the heat absorptive property of gas which is in course of expansion, and reacting upon a so refrigerated body of brine with said last mentioned gas, after said expansion thereof.

6. The improvement in the ammonia soda process which comprises reacting upon a body of ammoniated brine with carbon dioxid gas, removing from said brine the heat evolved by said reaction, by utilizing the heat absorptive property of carbon dioxid gas when in course of expansion, and reacting upon a so refrigerated body of said brine with said carbon dioxid after said expansion thereof.

7. The improvement in the ammonia soda process which comprises reacting upon ammoniated brine in a carbonating tower, with refrigerated carbon dioxid gas, by expanding said gas at a plurality of different levels in said tower, while refrigerating said brine by utilizing the heat absorptive property of said carbon dioxid manifested during said expansion.

8. The improvement in the ammonia soda process which comprises expanding a compressed gas in proximity to but separated from a body of ammoniated brine to absorb the heat generated by the reactions resulting in the production of sodium bicarbonate.

9. The improvement in the ammonia soda process which comprises expanding a compressed gas in proximity to but separated from a body of ammoniated brine to absorb the heat generated by the reactions resulting in the production of sodium bircarbonate and utilizing the said gas after expansion in the production of sodium bicarbonates.

In testimony whereof we have affixed our signatures, in the presence of two witnesses.

EDWARD E. ARNOLD.
PALMER ST. CLAIR, Jr.

Witnesses:
 FRANCES G. ALVERSON,
 H. L. WILCOX.